United States Patent [19]

Skeeters et al.

[11] Patent Number: 5,677,855
[45] Date of Patent: Oct. 14, 1997

[54] METHOD OF GENERATING GRINDING PATHS FROM A COMPUTER MODEL FOR CONTROLLING A NUMERICALLY CONTROLLED GRINDER

[75] Inventors: Clifford M. Skeeters; Chris W. Benjamin, both of Memphis, Tenn.

[73] Assignee: Smith & Nephew, Inc., Memphis, Tenn.

[21] Appl. No.: 380,946

[22] Filed: Jan. 31, 1995

[51] Int. Cl.$^6$ ..................................... G06F 15/46
[52] U.S. Cl. ........................ 364/578; 364/474.06
[58] Field of Search .................. 364/474.01–.09, 364/578

[56] References Cited

U.S. PATENT DOCUMENTS

| | | | |
|---|---|---|---|
| 2,852,189 | 9/1958 | Becker et al. | 235/61 |
| 3,259,022 | 7/1966 | Vietorisz | 96/13.5 |
| 3,766,369 | 10/1973 | Watanabe et al. | 235/151.11 |
| 3,861,044 | 1/1975 | Swinson, Jr. | 32/17 |
| 4,301,349 | 11/1981 | Inoue | 219/69 W |
| 4,302,097 | 11/1981 | Chlestil | 355/52 |
| 4,324,546 | 4/1982 | Heitlinger et al. | 433/25 |
| 4,355,447 | 10/1982 | Dimatteo et al. | 29/26 A |
| 4,385,360 | 5/1983 | Yamada et al. | 364/514 |
| 4,393,450 | 7/1983 | Jerard | 364/474 |
| 4,411,626 | 10/1983 | Becker et al. | 433/223 |
| 4,430,718 | 2/1984 | Hendren | 364/188 |
| 4,436,684 | 3/1984 | White | 264/138 |
| 4,575,805 | 3/1986 | Moermann et al. | 364/474 |
| 4,704,686 | 11/1987 | Aldinger | 364/468 |
| 4,837,703 | 6/1989 | Kakazu et al. | 364/474.18 |
| 4,936,862 | 6/1990 | Walker et al. | 623/23 |
| 5,060,164 | 10/1991 | Yoneda et al. | 364/474.29 |

OTHER PUBLICATIONS

Richard L. Simon, "A Sculptured–Surface Program," 46 Machine Design 116–121, Aug. 1974.

*Primary Examiner*—Kevin J. Teska
*Assistant Examiner*—A. S. Roberts
*Attorney, Agent, or Firm*—Pravel, Hewitt, Kimball & Krieger

[57] ABSTRACT

A method of manufacturing a distal femoral knee prosthesis includes the initial step of forming a rough prosthesis workpiece member that has the approximate size and shape of a final polished distal femoral prosthesis. The rough prosthesis workpiece member can be a casting, forging or a rough machined part. The prosthesis member is then attached to a fixator and movably supported adjacent a grinding wheel in a numerically controlled grinder. Relative motion between the grinding wheel and the prosthesis is controlled with a computer. An articular surface of the prosthesis is shaped by engaging the prosthesis with the rotary grinder. The grind program for the numerically controlled grinder is generated from data representing a CAD/CAM model of a joint prosthesis. The process of generating the grind program includes first the step of generating path data points for a ball-endmill having a radius equal to the nose radius of the rotary grinding wheel. Next, the path data points are modified to compensate for a ball-endmill having a radius equal to the wheel radius of the grinding wheel.

13 Claims, 12 Drawing Sheets

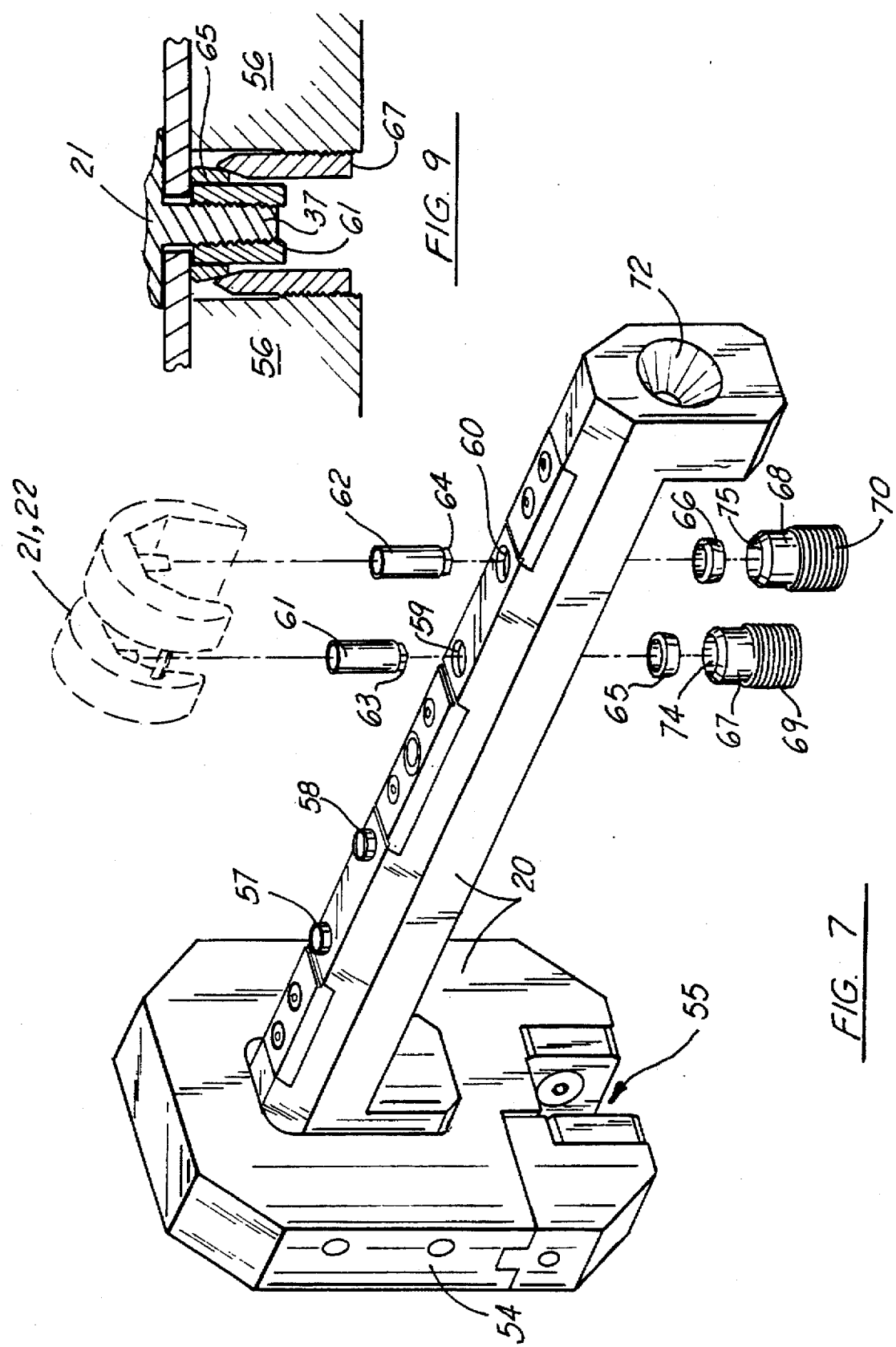

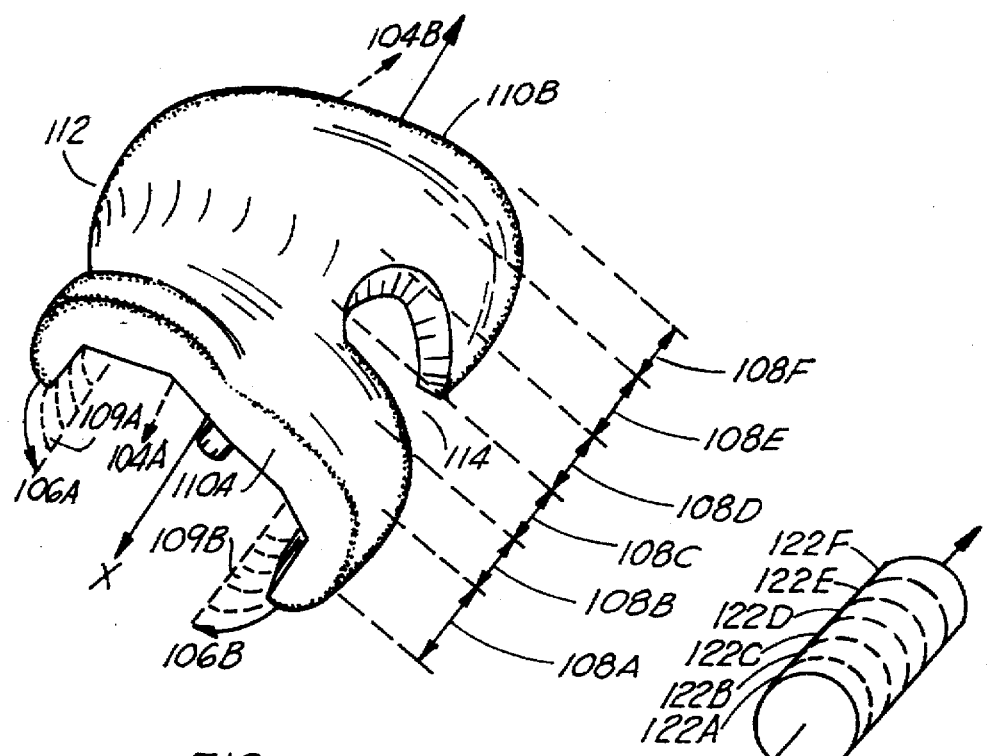
FIG. 15
FIG. 15A
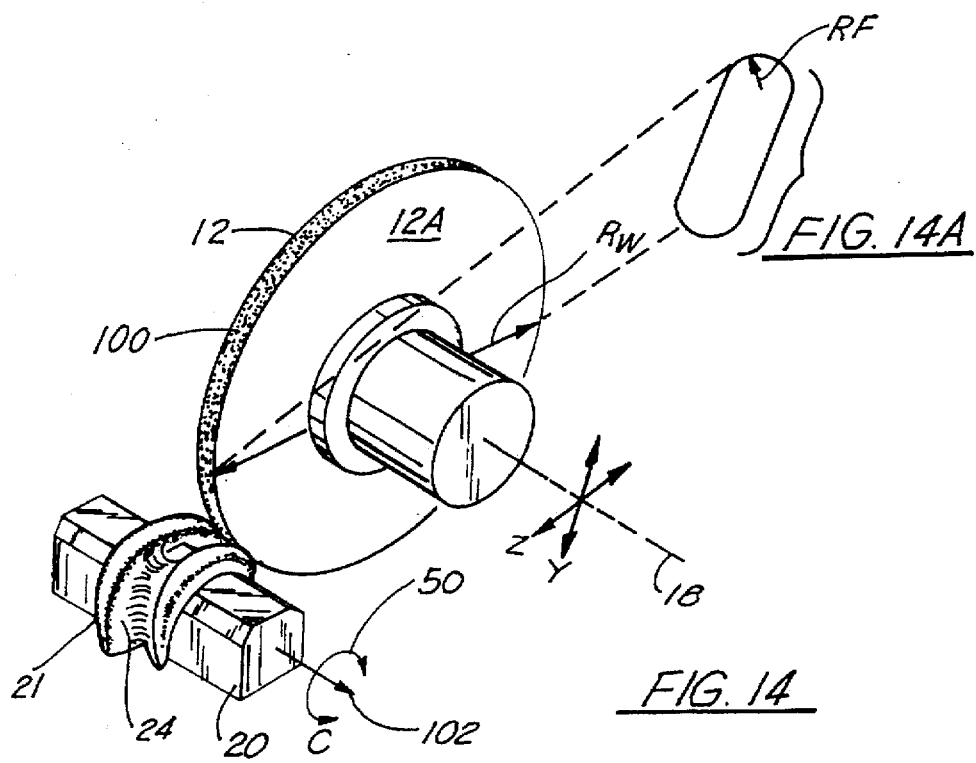
FIG. 14A
FIG. 14

5,677,855

METHOD OF GENERATING GRINDING PATHS FROM A COMPUTER MODEL FOR CONTROLLING A NUMERICALLY CONTROLLED GRINDER

BACKGROUND OF THE INVENTION

1. Field of the Invention

The present invention relates to surgical orthopedic implants and methods of manufacturing same. More particularly, the invention relates to a method of generating a grind program for controlling a numerically controlled grinder for shaping a selected joint prosthesis component from data representing a model of an orthopedic joint prosthesis.

2. Description of the Related Art

Prosthetic joint devices are well known in the art. One of the most common types of joint prosthetic devices is a knee prosthesis that includes a femoral component and a tibial component. The femoral component typically has a "J" shape and includes a distal articulating surface with anterior, distal and posterior condylar portions. The non-articulating surface of the prosthesis includes a number of flat intersecting surfaces that mate with similarly shaped surfaces surgically formed on the patient's distal femur.

One of the problems that has plagued the manufacture of femoral knee implants is that of proper sizing and shaping. The distal femoral articulating surface is a complex structure. In the past, sizing and shaping this structure has been a highly labor intensive process that requires a number of manual polishing steps. However, these polishing steps are typically performed by workers that do not exactly duplicate the same shape each time. Variations can occur even at the same factory between two different workers.

The manual steps involve the use of CAM grinders and belts. The CAM grinders are manually operated to create shapes on the articulating surfaces of the parts, while the belt is used to form shapes on the non-articulating surfaces as well as to finish the articulating surfaces. This manual intensive method of creating prosthetic joint devices results in poor accuracy.

SUMMARY OF THE PRESENT INVENTION

The present invention provides a highly effective and controllable method of manufacturing a distal femoral knee prosthesis.

The method of the present invention begins with the formation of a rough prosthesis workpiece member that has the approximate size and shape of a final polished distal femoral prosthesis using preferably a CNC grinder.

The workpiece can be a cast metallic part for example. The prosthesis member is attached to a fixator. The fixator is movably supported adjacent a rotary grinder wheel. A computer is used to control relative motion between the rotary grinder wheel and the prosthesis workpiece member.

It is an object of the present invention to develop a process for generating data points representing grinding paths for controlling a numerically controlled or CNC grinder to create the desired shape on selected prosthetic joint components, wherein the grinding paths are generated from data representing a computer model of a joint prosthesis.

A curved "J" shaped articular surface of the prosthesis member is formed by engaging the prosthesis with the rotating grinder wheel. The grinder wheel has a wheel radius, and further includes a grinding surface having a nose radius. The process of generating grinding path data points from the computer model data includes first generating grinding paths for a ball-endmill tool which has a radius equal to the nose radius of the grinder wheel. Next, from the nose radius data points, the grinding paths for a ball-endmill tool having a radius equal to the wheel radius of the grinder wheel are generated.

In the preferred method, the grinding wheel sculpts the articular surface by forming a plurality of generally parallel grooves adjacent one another. This also forms "peaks" at the intersections of two adjacent grooves sculpted by the grinding wheel. The articulating surface of the workpiece is preliminarily polished to remove peaks that occur between adjacent grooves cut by the rotary grinder wheel. Thereafter, the articular surface is secondarily polished until it has a highly polished mirror finish.

In the preferred method, the rotary grinder and the fixator each have central longitudinal axes. These axes are maintained generally parallel during a shaping of the articular surface of the prosthesis member with the grinder wheel.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 7 is a fragmentary exploded perspective view of the preferred embodiment of the apparatus of the present invention;

FIG. 9 is a fragmentary sectional view of the preferred embodiment of the apparatus of the present invention illustrating the attachment between the prosthesis component and grinding fixture;

FIG. 14 is a fragmentary perspective view of the preferred embodiment illustrating the various axes of movement of the grinding fixture and grinding wheel;

FIG. 14A is a top view of the grinding wheel illustrating its nose radius;

FIG. 15 is a perspective view of a prosthesis workpiece to illustrate how the workpiece is sectioned during creation of data points for a CNC grinder;

FIG. 15A is a block diagram showing a plurality of cylindrical subsections which enclose the computer model of the prosthesis;

DETAILED DESCRIPTION OF THE PREFERRED EMBODIMENT

Figure 1:
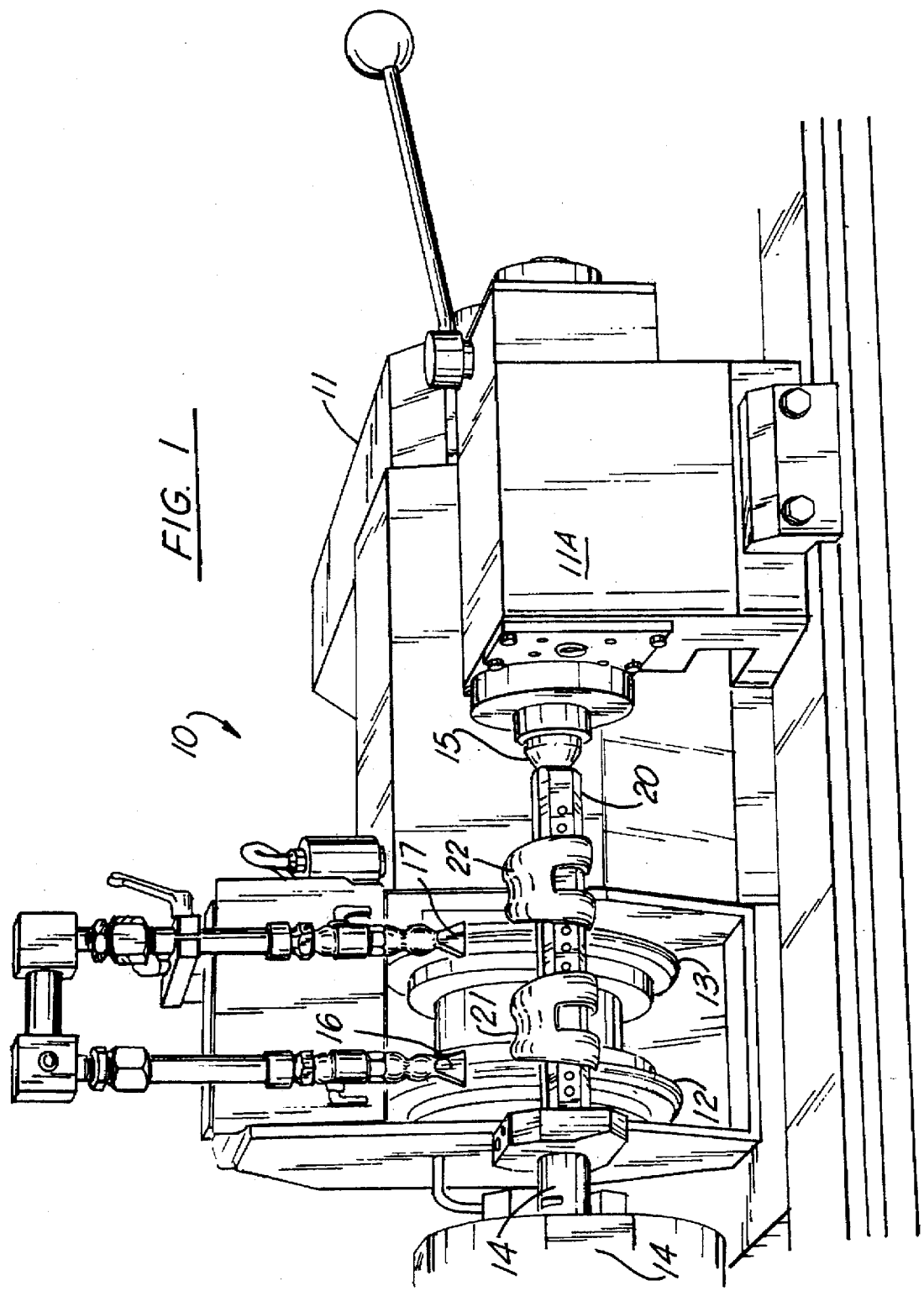
FIG. 1 is a perspective view of the preferred embodiment of the apparatus of the present invention.
Figure 2:
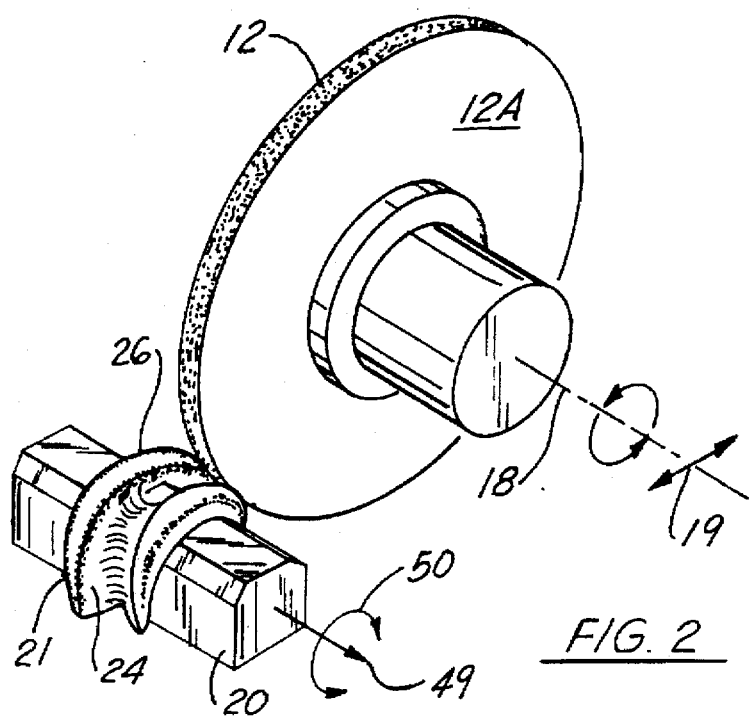
FIG. 2 is a fragmentary perspective view of the preferred embodiment of the apparatus of the present invention.
Figure 3:
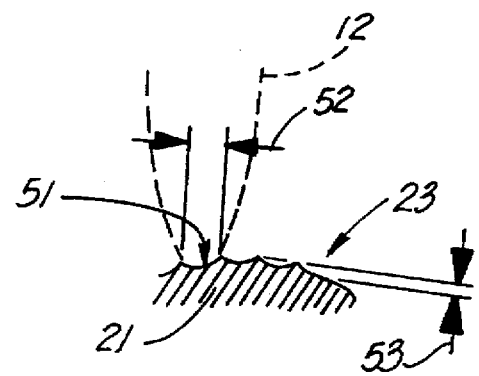
FIG. 3 is a fragmentary schematic view illustrating the grinding step of the method of the present invention.

FIGS. 1–3 show the preferred embodiment of the apparatus of the present invention designated generally by the numeral 10. Prosthesis grinding apparatus 10 includes a grinding fixture 20 supported between work head 14 and a tailstock 11A in a conventional programmable numerically controlled or CNC multi-axis grinder 11 that includes for example a pair of spaced apart rotary grinding wheels 12, 13 and spaced apart holding portions 14, 15. In the preferred embodiment, the CNC grinding machine 11 is a CNC Precision Grinder built by Weldon Machine Tool, Inc. The holding portions 14, 15 interface with end portions of the grinding fixture 20 after prosthesis components 21, 22 are attached thereto. Components 20, 21 include femoral component workpiece 21 and femoral component workpiece 22.

Programmable grinder 11 can include fluid dispensers for dispensing a desired cooling fluid to the grinding apparatus as is known in the art. Such fluid dispensers 16, 17 are typically supplied with commercially available programmable CNC grinders 11, a fluid dispenser 16, 17 being positioned respectively above each grinding wheel 12, 13.

In FIG. 2, the axis of rotation 18 of grinding wheel 12 is illustrated. The grinding wheel 12 rotates about axis 18. Wheel 12 also moves in an anterior/posterior direction relative to the workpiece 21 along an anterior/posterior direction created by relative movement between paths 19 and 50 in FIG. 2.

In combination with the rotary movement of grinder 12 and its for and aft movement along path 19, there is also provided relative movement between grinding wheel 12 and prosthesis component 21 by moving grinding fixture 20. In FIG. 2, arrows 49 indicate schematically lateral/medial movement of grinding fixture 20 relative to wheel 12. The plane of wheel 12 is designated as 12A. Curved arrow 50 schematically illustrates rotation in an anterior posterior direction of the component 21 relative to wheel 12.

A controller in the programmable grinder 11 is programmed to rotate the wheel 12 at a desired speed, move the wheel for and aft along the path 19 a desired degree during cutting of the prosthesis 21, rotate the grinding fixture 20 about its central longitudinal axis and move the grinding fixture 20 in the lateral/medial direction along path 49. The desired movements of the grinding wheel 12 and the grinding fixture 20 are initially specified in a CAD/CAM system that has the desired model of the prosthetic joint device. The program for controlling the grinder 11 is described below in FIGS. 16 and 17A–C. The described combination of movements presents various anterior, distal, and posterior articulating surfaces of the femoral component 21 to the grinding wheel 12. In this fashion, grooves or scallops are formed in the articulating 23 surface of the femoral component workpiece 21 as shown in FIG. 3. Grooves or scallops are formed on the femoral component work piece 22 in a similar fashion. The grooves or scallops are designated as 51 in FIG. 3. Grooves 51 are spaced apart by measure that is designated by the arrows 52 in FIG. 3 as groove spacing. Further, each of the grooves have a thickness that is designated by the arrows 53 in FIG. 3. The thickness of each groove as indicated by arrows 52 is preferably 0.015 inches. The depth of each groove is variable, depending on which part of the articulating surface 23 the groove is located.

Figure 4:
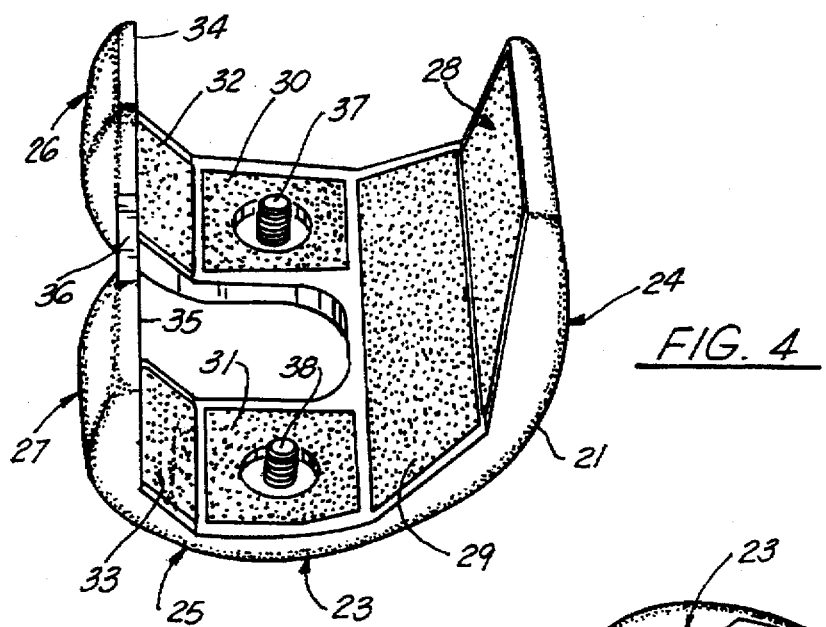
FIG. 4 is a perspective view of a prosthesis workpiece to be finished using the method of the present invention.
Figure 5:
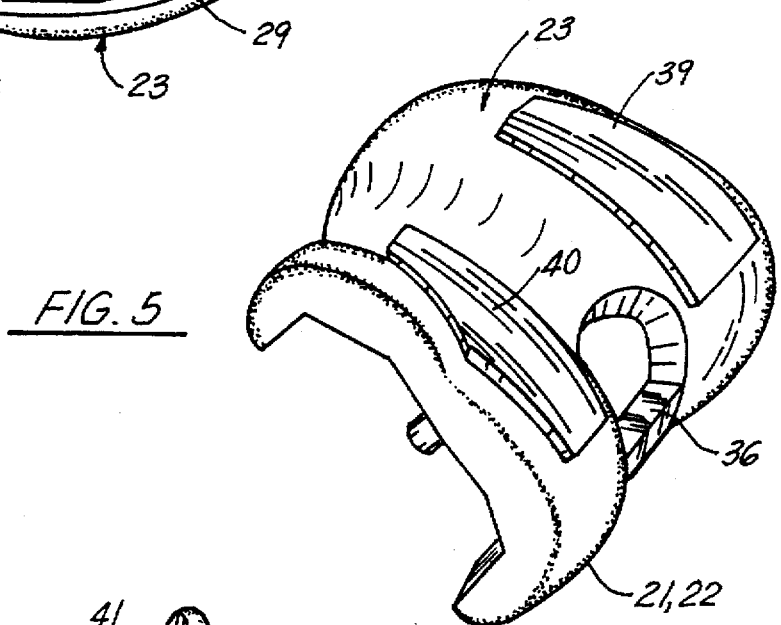
FIG. 5 is another perspective view of a prosthesis workpiece to be finished using the method of the present invention.
Figure 6:
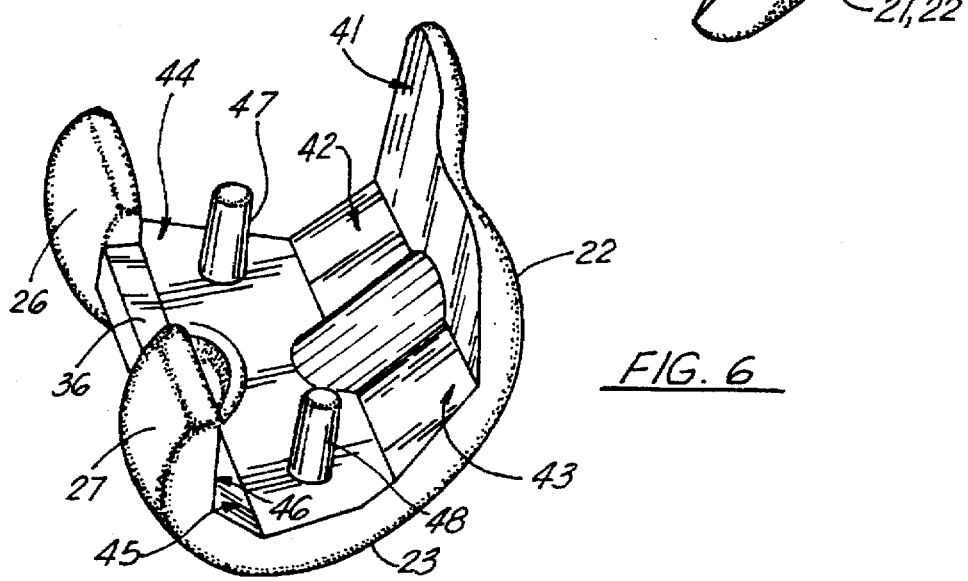
FIG. 6 is a perspective view of a prosthesis to be finished using the method of the present invention.

In FIGS. 4–6, two femoral component workpieces 21, 22 are shown for purposes of illustration. In FIG. 4, femoral component workpiece 21 is provided with threaded attachments 37, 38 and with a bone ingrowth surface that is comprised of a plurality of non-articulating surfaces 28–35. In FIGS. 5 and 6, femoral component workpiece 22 is provided with unthreaded, smooth attachment posts 47, 48.

In FIG. 4, the femoral component workpiece 21 includes an outer, articulating surface 23 that is to be dressed using the method and apparatus of the present invention. The articulating surface 23 includes an anterior end surface 24, a distal end surface 25, and a pair of spaced apart posterior condylar surfaces 26, 27. The non-articulating surfaces 28–35 include anterior non-articulating surface 28, chamfer surfaces 29 and 32–33, distal non-articulating surfaces 30, 31 and posterior condylar non-articulating surfaces 34, 35. Transverse bar 36 can form a connection between condylar portions of the prosthesis workpiece 24 that are covered with exterior condylar surfaces 26, 27 and with the surfaces 34, 35.

In FIG. 4, the attachment posts 37, 38 are threaded. These threaded posts 37, 38 must be protected from damage when component 21 is subjected to programmable grinder 11 according to the method of the present invention as will be described more fully hereinafter.

In FIG. 6, component 22 includes smooth surfaces 41–46 and smooth posts 47, 48. The surface 41 is an anterior surface. The surfaces 42–43 and 45 are chamfer surfaces. Surface 44 is a distal non-articulating surface. Surface 46 is a posterior non-articulating surface. In each of the workpiece of FIGS. 4 and 6, the rear non-articulating surfaces 28–35 and 41–46 are surfaces that register with similarly shaped cut surfaces on the patient's distal femur as prepared by a surgeon.

In FIG. 5, a workpiece 22 is shown and more specifically the articulating 23 surface thereof. The present invention provides an improved method for shaping such workpieces 21, 22 having articulating surfaces 23. These workpieces 21, 22 begin as castings, rough machinings, forgoings or the like. For example, if workpieces 21, 22 begin as castings, they can have projecting portions 39, 40 that are formed during casting and which must be removed as part of the method of the present invention.

FIG. 7 illustrates a more detailed view of grinding fixture 20. Grinding fixture 20 has an enlarged end portion 54 held by grinder holder 14. End portion 54 provided a recess 55 that can be engaged by a torquing member for imparting rotation to the grinding fixture 20 as generated by the programmable grinder 11. The grinding fixture 20 includes an elongated bar 56 having a plurality of cylindrically shaped openings 57–60, each of the openings 57–60 having a central longitudinal axis that is perpendicular to the axis of rotation of the grinding fixture 20. In FIG. 2, the axis of rotation of grinding fixture 20 is defined by arrow 49.

Because each of the cylindrical openings 57–60 has an axis that is perpendicular to the axis of rotation of fixture 20, this similarly places each of the non-articulating surfaces 28–35 of prosthesis 21 and 41–46 of prosthesis 22 at right angles to the anterior posterior travel path 19 of grinding wheel 12 and also at right angles to the plane of grinding wheel 12 designated as 12A in FIG. 2.

Figure 8:
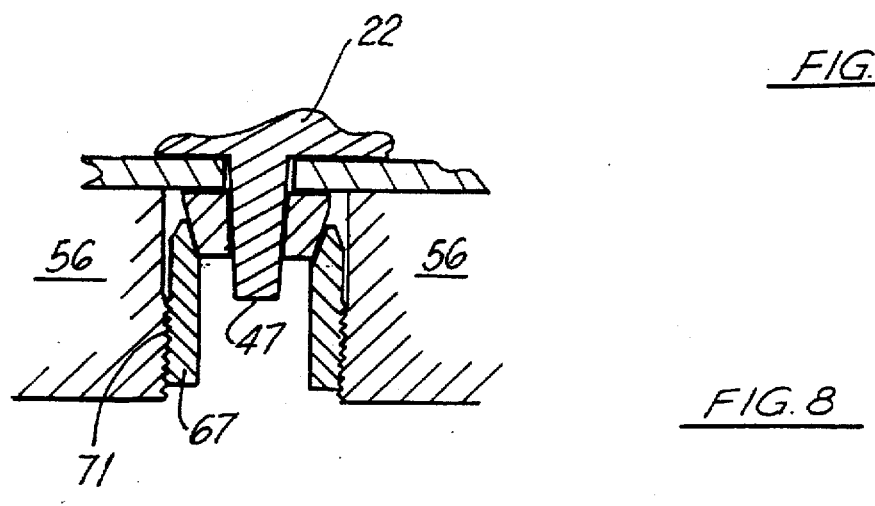
FIG. 8 is a fragmentary sectional view of the preferred embodiment of the apparatus of the present invention illustrating the attachment between the prosthesis component and grinding fixture.

FIGS. 8–9 show the connection formed between a post 37, 47 of a component 21 or 22 and the elongated transverse bar 56 of fixture 20. In FIG. 9, the sectional view illustrates the connection formed between component 22 and bar 56 of fixture 20. When a component 21 is to be connected to fixture 20 and the component 21 has threaded attachment posts such as 37, a thread protector 61, 62 is threadably attached to the threaded attachment post 37, 38. Thread protector 61, 62 provides an internal threaded bore with internal threads that match the external threads of the posts 37, 38.

Each of the thread protectors 61, 62 can have a hexagonal drive portion 63, 64 to aid in a solid attachment of the particular thread protector 61, 62 to a selected of the threaded posts 37, 38.

In FIG. 9, a thread protector 61 has been applied to a threaded attachment post 37. In order to complete an attachment of the workpiece 21 to the grinding fixture 20, the user places annular sleeve 65 or 66 over the thread protector 61, 62 as shown in FIGS. 7 and 9.

Threaded sleeves 67, 68 then extends over the thread protector 61 and ferrule 65 as shown in FIG. 9. The threaded sleeve 67, 68 have external threads 69, 70 that engage corresponding internal threads 71 that line a portion of the selected opening 59, 60 as shown in FIG. 9. Each of the threaded sleeves 67, 68 each provide beveled annular surfaces 74, 75 respectively that engage the outer surface of ferrules 65, 66 for forming a wedge lock connection therewith. As the user tightens the selected threaded sleeve 67, 68, the selected components 21, 22 is rigidly connected to grinding fixture 20.

In FIG. 8, a connection is shown between prosthesis component 22 having a smooth attachment post 47 and the grinding fixture 20. In FIG. 8, annular sleeve 65 connects directly to the unthreaded attachment post 47. Threaded sleeve 67 then engages the threads 71 of bar 56 to form a wedge lock connection between the beveled annular surface 74 of sleeve 67 and the outer surface of the annular sleeve 65.

Figure 11:
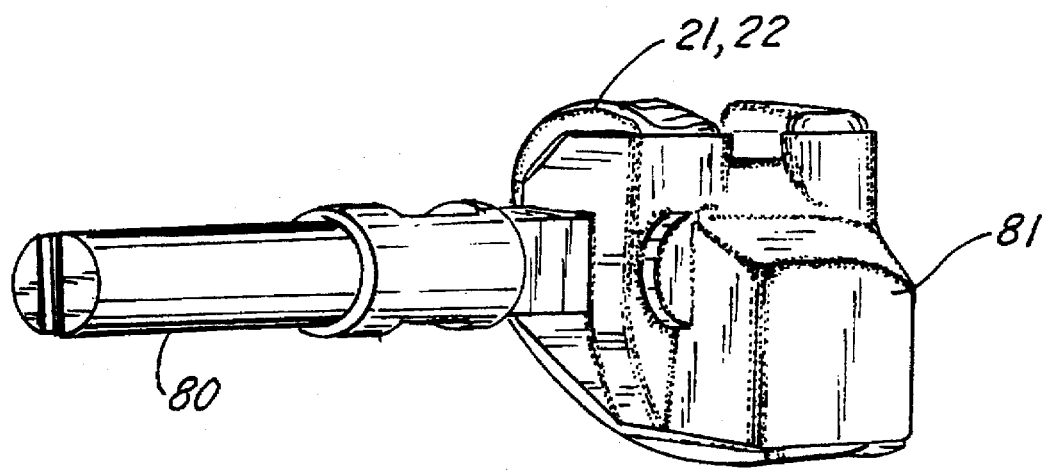
FIG. 11 is a fragmentary perspective view of the preferred embodiment of the apparatus of the present invention illustrating the coarse polishing fixture portion thereof.
Figure 10:
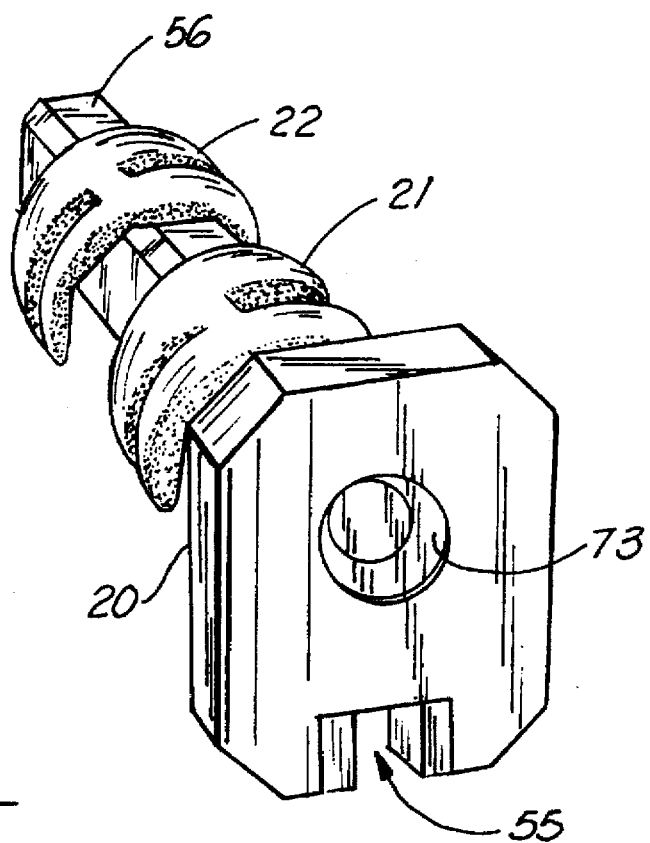
FIG. 10 is a fragmentary perspective end view of the preferred embodiment of the apparatus of the present invention illustrating the grinding fixture.

After the plurality of grooves or scallops 51 are formed in the external surface 23 (i.e. the articulating surface 23 of the selected femoral component 21, 22, the component 21, 22 is first subjected to a coarse polishing. During the coarse polishing each component workpiece 21, 22 is affixed to a polishing fixture 80 as shown in FIG. 11. The connection between the selected component 21, 22 and the elongated bar like fixture 80 can be the same type of connection as with the fixture 20 as shown in FIGS. 7, 8, and 9.

In order to protect all but the articulating surface from the coarse polishing, urethane protector block 81 is added to the component 21 or 22 as shown in FIG. 11. Protector block 81 can be of urethane plastic for example and extend both in a lateral medial direction and in an anterior posterior direction so that all of the non-articulating surfaces 28–25 or 41–46 are covered and protected from contact with polishing media 90 during the coarse polishing.

Figure 12:
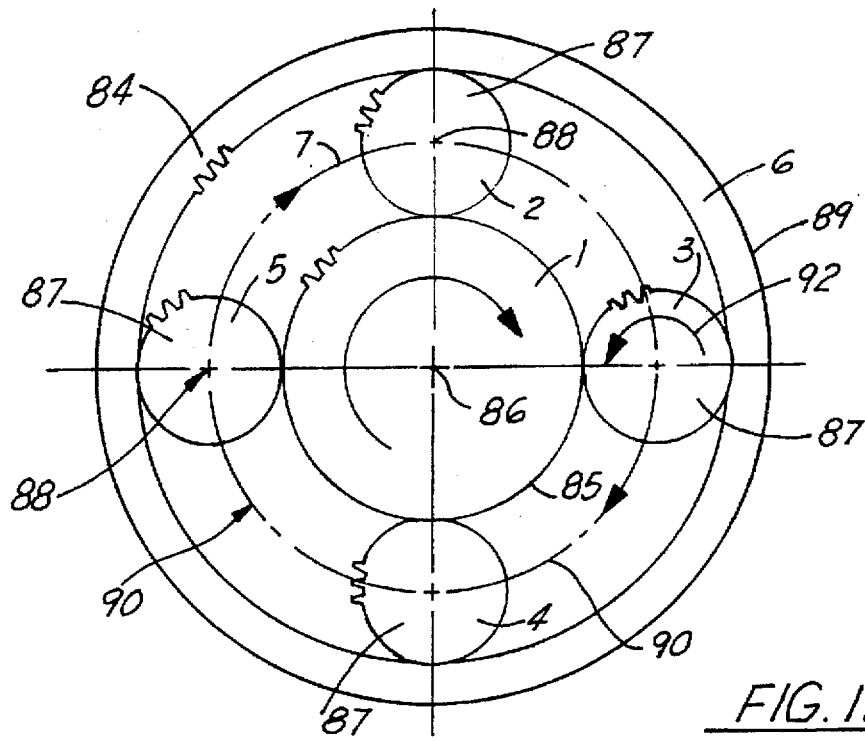
FIGS. 12–13 are schematic views illustrating the coarse polishing step of the method of the present invention.
Figure 13:
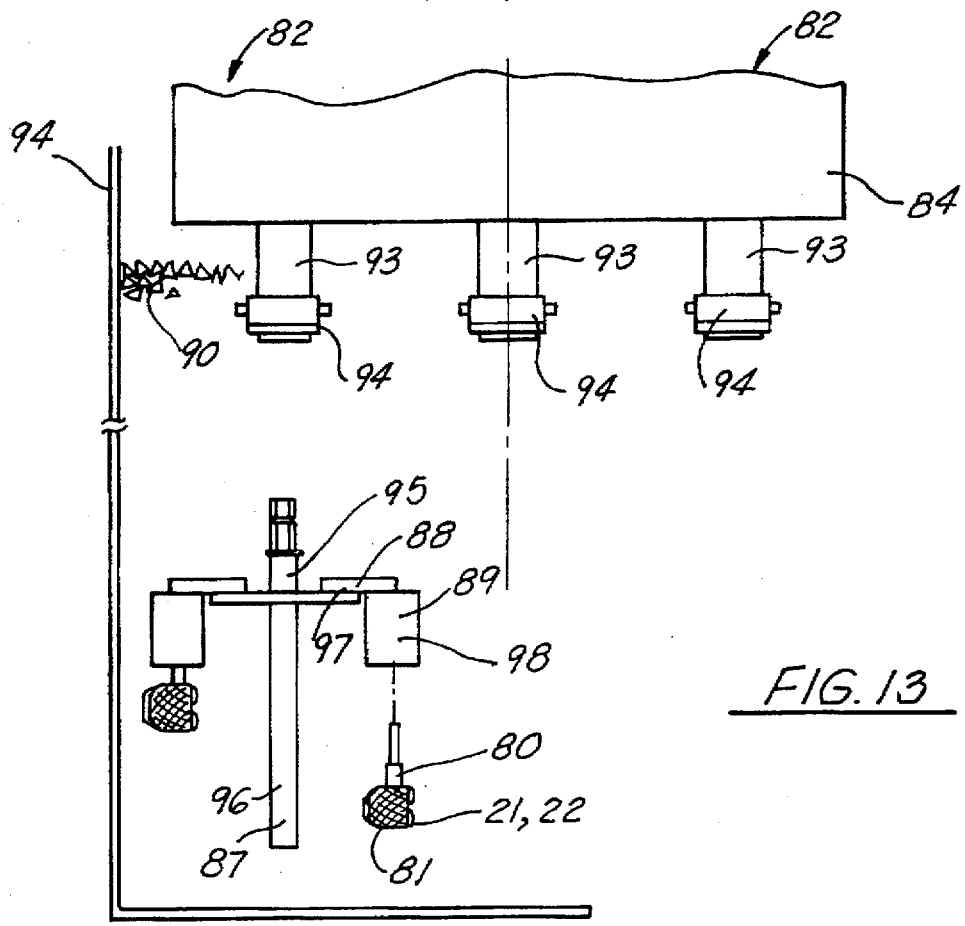

In FIGS. 12–13, the coarse polishing method step is schematically shown. In FIGS. 12–13 there can be seen a motor drive 83 that powers and rotates a sun gear 85 within gear case 84. The gear case 84 includes motor driven sun gear 85 having axis of rotation 86. Sun gear 85 is powered to rotate and drive a plurality of four planetary gears 87, each having an axis of rotation 88. An outer housing gear 89 surrounds and engages the planetary gears 87 and sun gear 85.

In FIG. 12, a circular path 90 indicates the travel path followed by of each of the planetary gears 88. Curved arrow 91 indicates the direction of rotation of the sun gear 85. Curved arrow 92 indicates the direction of rotation of the planetary gears 87.

In FIG. 13, the planetary gear case 84 is shown having a plurality of extensions shafts 93 extending downwardly therefrom, each attached respectively to a planetary gear 87 within planetary gear case 84. Each of the extension shafts 93 carries a chuck 94 for holding a holding fixture 95.

The holding fixture 95 includes a vertical shaft 96, a plurality of circumferentially spaced, radially extending arms 97, and a plurality of holders 98 that can form an attachment with the polishing fixture 80.

The plurality of holding fixtures 95 are supported within a tank 99 that contains media 100, a commercially available polishing media. Rotation of the fixtures 95 within tank 99 and the contained media 100 removes the scallops formed on the articulating surface of each workpiece 21, 22.

After coarse polishing, the component workpiece 21, 22 can be finely polished using a commercially available computer controlled polishing machine such as shown and described in U.S. Pat. No. 4,753,044 which is incorporated herein by reference.

The following table lists the parts numbers and parts descriptions as used herein and in the drawings attached hereto:

| PARTS LIST | |
|---|---|
| Part Number | Description |
| 10 | prosthesis grinder apparatus |
| 11 | grinder |
| 11A | grinder tailstocks |
| 12 | grinding wheel |
| 12A | plane of rotation |
| 13 | grinding wheel |
| 14 | grinder workhead |
| 15 | tailstock center |
| 16 | fluid dispenser |
| 17 | fluid dispenser |
| 18 | axis of rotation of grinding wheel |
| 19 | path |
| 20 | grinding fixture |
| 21 | femoral component workpiece |
| 22 | femoral component workpiece |
| 23 | articulating surface |
| 24 | anterior end |
| 25 | distal end |
| 26 | posterior condylar surface |
| 27 | posterior condylar surface |
| 28 | non-articulating surface |
| 29 | non-articulating surface |
| 30 | non-articulating surface |
| 31 | non-articulating surface |
| 32 | non-articulating surface |
| 33 | non-articulating surface |
| 34 | non-articulating surface |
| 35 | non-articulating surface |
| 36 | transverse bar |
| 37 | attachment post |
| 38 | attachment post |
| 39 | casting gate |
| 40 | casting gate |
| 41 | anterior surface |
| 42 | chamfer surface |
| 43 | chamfer surface |
| 44 | distal surface |

-continued

PARTS LIST

| Part Number | Description |
| --- | --- |
| 45 | chamfer surface |
| 46 | posterior surface |
| 47 | attachment post |
| 48 | attachment post |
| 49 | arrow |
| 50 | curved arrow |
| 51 | scallop |
| 52 | scallop spacing |
| 53 | scallop height |
| 54 | enlarged end |
| 55 | recess |
| 56 | elongated bar |
| 57 | opening |
| 58 | opening |
| 59 | opening |
| 60 | opening |
| 61 | thread protector |
| 62 | thread protector |
| 63 | hex drive |
| 64 | hex drive |
| 65 | ferrule |
| 66 | ferrule |
| 67 | threaded sleeve |
| 68 | threaded sleeve |
| 69 | external threads |
| 70 | external threads |
| 71 | internal threads |
| 72 | conical socket |
| 73 | conical socket |
| 74 | annular surface |
| 75 | annular surface |
| 80 | polishing fixture |
| 81 | protector block |
| 82 | coarse polisher |
| 83 | motor drive |
| 84 | planetary gear case |
| 85 | sun gear |
| 86 | axis of rotation |
| 87 | planetary gear |
| 88 | axis of rotation |
| 89 | housing gear |
| 90 | circular path |
| 91 | curved arrow |
| 92 | curved arrow |
| 93 | extension shaft |
| 94 | chuck body |
| 95 | holding fixture |
| 96 | shaft |
| 97 | arm |
| 98 | holder |
| 99 | tank |
| 100 | media |

Currently, computer models of the prosthetic joint devices are created using CAD/CAM software. Use of the CAD/CAM software facilitates the design of the prosthetic joint devices as the shape and size of the devices can be specified directly in the CAD/CAM model. Certain CAD/CAM systems are capable of interfacing directly to numerically controlled milling machines to shape prosthetic components. However, milling machines do not provide the desired finish on the more complex structures of a knee prosthesis. Other CAD/CAM systems are capable of interfacing to CNC grinders, although these type systems are generally more expensive. Many CAD/CAM systems, however, are not capable of generating grinding paths for controlling CNC grinders.

The major obstacle to converting data representing the CAD/CAM model of the prosthetic joint device to grinding path data provided to the multi-axis CNC grinder 11 is that two radii exist on the grinding wheel 12. As best seen in FIG. 14, the grinding wheel 12 preferably has a diameter of 14 inches or a radius $R_W$ of 7 inches across surface 12A. The grinding wheel 12 also has a grinding surface 100, which is not flat, but rather protrudes outwards in a rounded shape. Referring to FIG. 14A, a top view of the grinding wheel 12 is shown. As seen from the top view, the face 100 of the grinder 12 is shaped generally like a flattened "U" having a nose radius $R_F$. In the preferred embodiment, the nose radius $R_F$ ranges between 0.375 inches, 0.625 inches and 0.750 inches. For grinding simple geometries, the nose radius of the face 100 of the grinder 12 is usually insignificant. However, as seen in FIG. 3, the grinding wheel 12 has to cut parallel grooves 51 on the articulating surface 23 of the selected component 21 or 22. As a result, the nose radius $R_F$ of the cutting surface 100 of the grinding wheel 12 must be taken into account as the grinding wheel 12 is cutting on both sides of its cutting surface 100. Consequently, the grinding path data for controlling the CNC grinder 11 generated from the CAD/CAM model data must factor in both the nose radius $R_F$ and wheel radius $R_W$.

One relatively straightforward method of converting CAD/CAM data to CNC grinding path data but which does not achieve the desired accuracy entails the use of a digitizer probe stylus in the exact shape of the grinding wheel 12. The CAD/CAM model data are provided to a CNC milling machine to create a milled "master" model of the femoral component made from aluminum. Once the master aluminum model is created, the probe stylus is used to digitize the shape of the master femoral component. As the shape of the probe stylus is exactly that of the grinding wheel 12, including the wheel radius $R_W$ and nose radius $R_F$, the digitized data provided by the probe stylus can be used to control the CNC grinder 11. One problem with this method is that the master model created by the milling machine is relatively inaccurate. Further, the cost of using the milling machine to create the intermediate aluminum model is expensive. Consequently, this method of converting CAD/CAM data to data for controlling the CNC grinder 11 is undesirable.

Referring still to FIG. 14, various axes are defined. As discussed earlier, the grinding wheel 12 is moved in a fore and aft direction 19 (FIG. 2) or along axis Z. During cutting, the selected component 21 or 22 is attached to the grinding fixture 20, which is rotated in an anterior/posterior direction 50 (FIG. 2) or along axis C. The fixture 20 is rotated about its center axis 102. Referring now to FIG. 15, a center axis X extends from one side 110A of the component 21 or 22 to the other side 110B. If the selected component 21 or 22 is fitted inside an imaginary cylinder having its top and bottom surfaces at each side 110A or 110B of the component 21 or 22, the X axis protrudes perpendicularly from the top and bottom surfaces of the imaginary cylinder. The center axis X corresponds approximately to the center axis of the imaginary cylinder. Further, the center X axis is defined to correspond exactly to the center axis 102 of the fixture 20, which is also represented as a CAD/CAM model. Thus, when the selected component 21 or 22 is attached to the grinding fixture for shaping, it must be ensured that the center axis of the selected component 21 or 22 correspond exactly to the center axis 102 of the grinding fixture 20. Further, as shown in FIG. 14, a Y axis perpendicular to both the Z and X axes is shown. Four axes are thus defined: an X axis that extends from one side 110A to the other side 110B of the joint prosthesis model; a Z axis along which the grinding wheel 12 moves in and out to grind the component 21 or 22; a angular rotation arrow C indicating the direction of rotation of the grinding fixture 20; and a Y axis indicating the top to bottom coordinates. It is noted that, in the preferred embodiment, neither the grinding wheel 12 or grinding fixture 20 moves in the direction of the Y axis. However, it is contemplated that movement along the Y axis can be accomplished with a more sophisticated CNC grinder 11.

Figure 16:
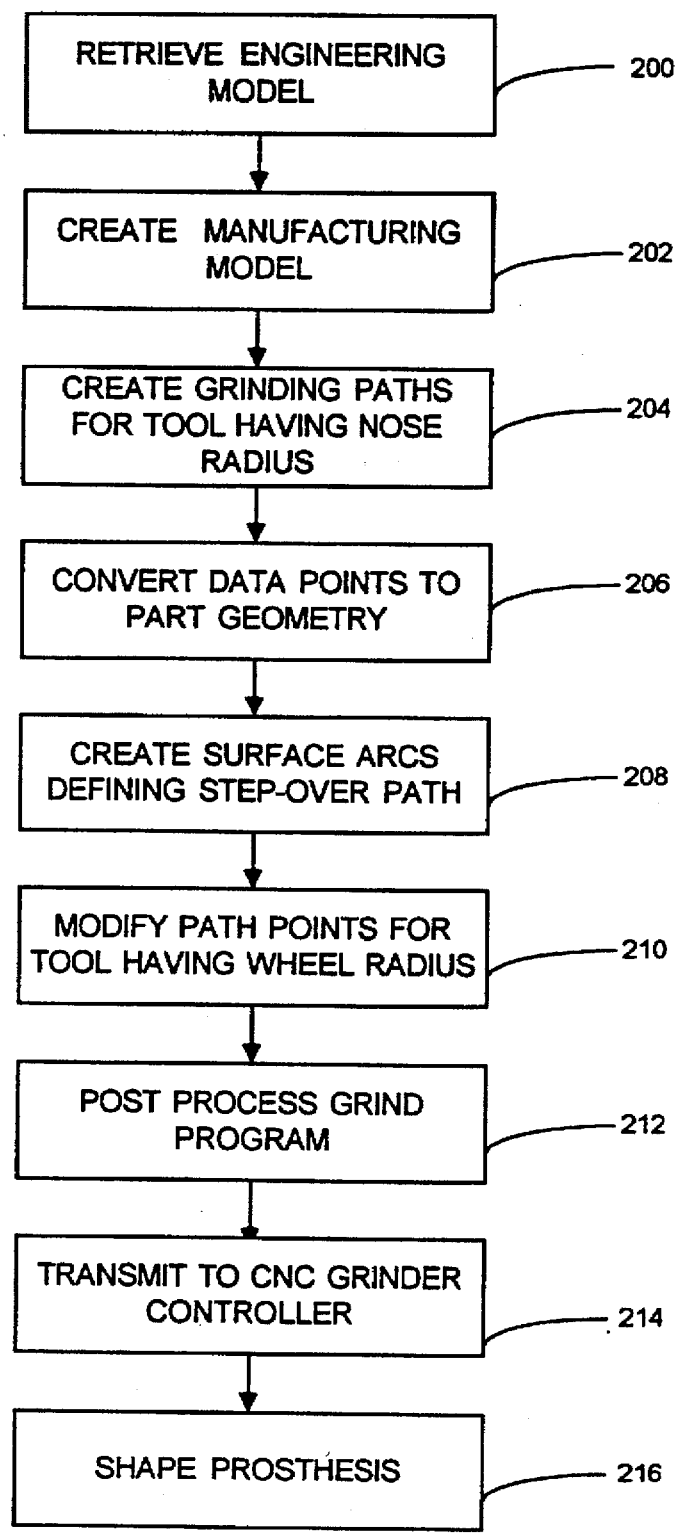
FIG. 16 is a flow diagram of the general steps according to the preferred embodiment of the present invention of generating CNC grinder grinding path data points from CAD/CAM model data.

Referring now to FIG. 16, the general steps are shown of the method of generating grinding path data points from CAD/CAM model data. Starting in step 200, the CAD/CAM engineering models are retrieved. There are typically a plurality of such engineering models for knee protheses. The different models correspond to the different shapes and sizes of knees for different people. Generally, during design of these engineering models, only models for the left knee are generated. The models for the right knee are mirrored versions of the left knee models. However, as will be discussed later, only the left knee engineering models are used by the preferred embodiment of the present invention.

Proceeding next to step 202, the engineering model retrieved in step 200 is converted into a manufacturing model. The manufacturing model includes extension surfaces to aid in the programming process. Further, in step 202, due to the tremendous amount of data needed for controlling the CNC grinder 11, the computer model is partitioned into 4 or 6 separate sections, with each section processed separately to prevent overloading the CAD/CAM system. Proceeding next to step 204, the data points along the grinding paths are defined for a ball-endmill tool having a radius equal to the grinder nose radius $R_F$, which ranges between 0.375, 0.625, or 0.750 inches. The data points are written to what are referred to as cutter-line-source or CLS programs or files. The number of CLS programs correspond to the number of sections chosen. These data points are intermediate data points that must be converted to take into account the wheel radius $R_W$ before it can be used to control the CNC grinder 11.

Proceeding next to step 206, the data points representing the path for the grinding wheel 12 are converted into X-Y-Z coordinates. Next, in step 208, spline rows or surface rings or arcs are created along the surface of the cylinder. These rows or arcs define the paths of the grinding wheel 12 as the grinding fixture 20 is stepped along the X axis. Proceeding next to step 210, a fixed axis milling program in the CAD/CAM system is executed to create new CLS programs or files for the chosen four or six sections. The CAD/CAM program creates surface grinding paths along the femoral component surface for a ball-endmill tool having a radius $R_W$, which is preferably 7 inches. The data points are stored in a new set of CLS programs. A clearance plane is also defined to ensure that the grinding wheel 12 does not accidentally damage the grinding fixture 20. The feed rates in the various axes of movement of the grinding wheel 12 and grinding fixture 20 in the CNC grinder 11 are also set.

Proceeding next to step 212, post processing is performed on the CLS programs or files. The post processing step combines the CLS files into a single main program, adds necessary header information for the CNC grinder 11, and performs a mirroring function to create the corresponding program for the opposite joint. For a knee prothesis, steps 200-210 create a CNC path control program for the left knee. Data points in the control program are mirrored to create another program for the right knee, such that the CNC grinder 11 can dress both left and right joint protheses. Proceeding next to step 214, the part programs are transferred to the CNC grinder 11. Due to the massive amounts of data involved, the main program is downloaded onto a tape for transfer to the CNC grinder 11. The tape is then mounted on to the CNC grinder 11 to load the programs into the controller of the CNC grinder 11. Control proceeds next to step 216, where the selected femoral component 21 or 22 is shaped. The coarse polishing and fine polishing steps described earlier are then performed.

Figure 17A:
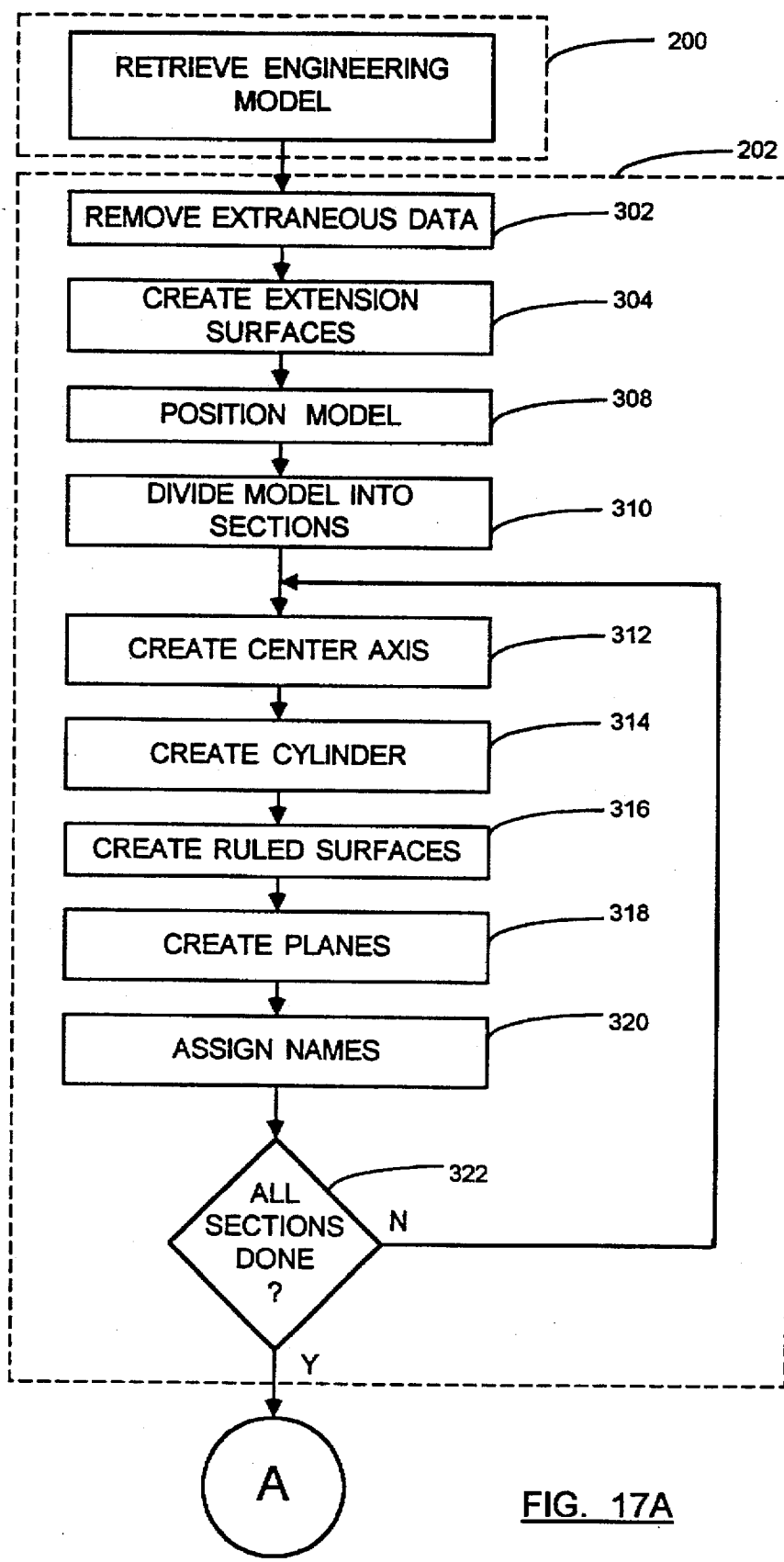
FIGS. 17A–C are a flow diagram of the detailed steps making up the general steps of FIG. 16.
Figure 17B:
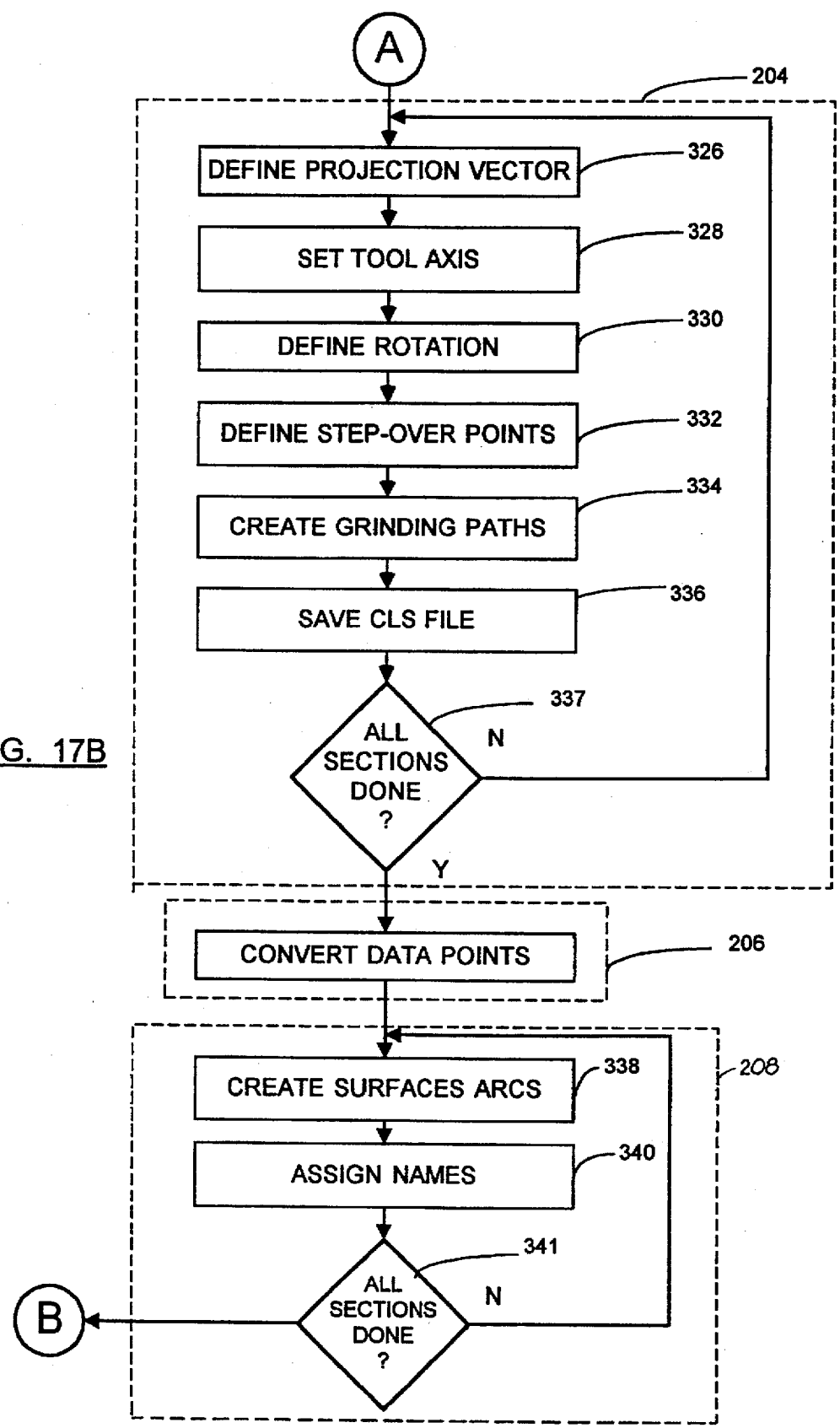
Figure 17C:
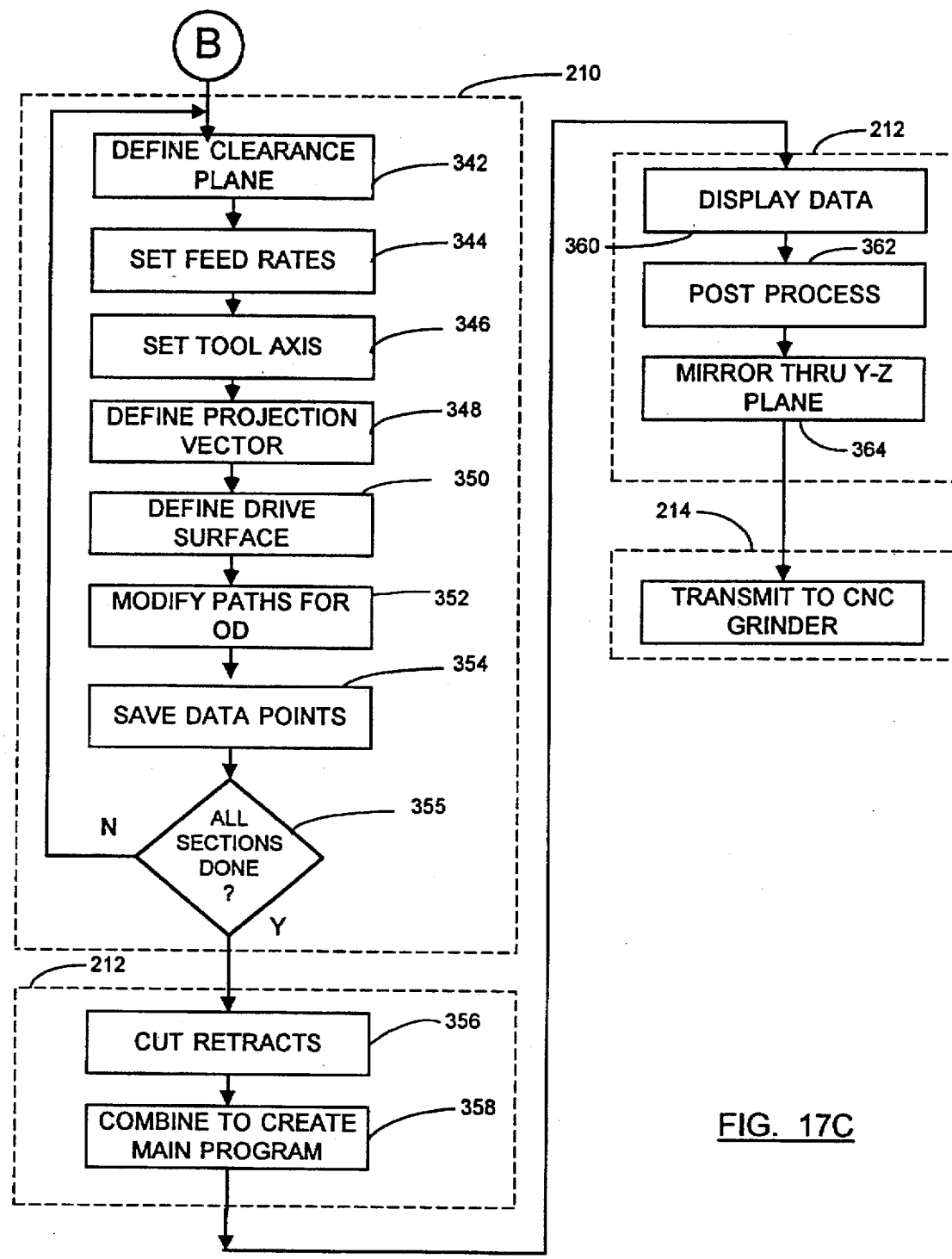

Proceeding now to FIGS. 17A-C, detailed substeps of the general steps described in FIG. 16 are shown. The dashed boxes enclosing the steps of FIGS. 17A-C refer to the general steps of FIG. 16. Starting again in step 200, the engineering model stored in a predetermined directory is transferred into a workstation running manufacturing CAD/CAM software, such as the Unigraphics II, Version 9.1 provided by EDS. Proceeding next to step 302, extraneous data are removed from the engineering model, leaving only the outer articular surfaces of the model. Proceeding next to step 304, extension surfaces are created in two directions on the model of the femoral component. Referring to FIG. 15, the two extension surfaces extend from the sides 110A and 110B of the prosthesis model in directions 104A and 104B, respectively. Both extension surfaces extend out by approximately 0.3 inches, and are angled towards the center axis of the prosthesis model. The extension surfaces do not actually exist on a prosthesis component that is to be grinded, but is used to allow for continuous ramp on and ramp off during creation of the grinding path data points in the CAD/CAM system.

Proceeding next to step 308, the computer model is positioned such that the X axis corresponds exactly to the center axis 102 of the grinding fixture 20. This ensures that the defined cutting paths are accurate with respect to the relative positions of the grinding wheel 12 and the grinding fixture 20. Next, in step 310, the manufacturing model of the femoral prosthesis is divided into four or six sections. As shown in FIG. 15, each of sections 108A-F run from the front 114 of the model to the rear 112 of the model. The reason for dividing the femoral prosthesis model into separate sections is because the CAD/CAM system is unable to handle the tremendous amount of data generated for the entire model all at once. Thus, the data points for each section are processed separately.

The following steps 312-320 are repeated for each of the sections 108A-F. In step 312, a center axis is defined for the section. The center axis for each section corresponds exactly with the X axis. Next in step 314, a cylinder is created enclosing the section, with the axis of the cylinder being the center axis defined in step 312. As shown in FIG. 15A, a large cylinder 120 encloses the computer model of the femoral prosthesis. The radius of the cylinder can be any arbitrary value, as long as the cylinder is large enough to enclose the entire prosthesis model. The cylinder 120 is subdivided into six separate cylinders 122A-F corresponding to sections 108A-F. As will be explained later, the surfaces of each of the cylinders 122A-F define the grinding paths of the wheel 12.

Proceeding next to step 316, ruled surfaces are created to extend from the front 114 and the rear 112 of the prosthesis model in direction 106A and 106B, respectively. The rule surfaces are defined as a plurality of curves 109A and 109B extending out by approximately 0.250 inches from the prosthesis model. The plurality of curves 109A and 109B essentially define extension surfaces which serve the same purposes as extension surfaces extending from sides 110A and 110B. Proceeding next to step 318, a plurality of regularly stepped planes are created. The surfaces of the planes are perpendicular to the center X axis, and essentially chop the prosthesis model from one side 110A to the other side 110B. In the outer sections 108A and 108F, the planes are spaced 0.020 inches apart along the X axis. In the inner sections 108B–E, however, the planes are spaced 0.015 inches apart. The outer sections 108A and 108F are less critical because they include primarily the extensions surfaces. Next in step 320, the axes, groups of planes, cylinders, axis lines, and ruled surfaces are assigned names for future reference. Proceeding next to step 322, it is determined if all the sections have been processed. If not, control returns to step 312. Otherwise, control proceeds to step 326.

Steps 326–336 below are repeated for each of the four or six sections.

Proceeding next to step 326, a projection vector is defined that indicates the direction in which the tool is pointed. In this case, the projection vector is pointed perpendicularly away from the center X axis. In effect, the projection vector indicates to the CAD/CAM system the direction of the articulating surface of the femoral component 21 or 22. Next in step 328, the tool axis or the axis 102 of the fixture 20 is set perpendicular to the drive surface, which is the surface of the cylinders 122A–F surrounding each section.

Proceeding next to step 330, the rotational path about the tool axis 102 is defined. In the preferred embodiment, the fixture 20 rotates about its axis 102 approximately a full 270°. The number of points in the rotational path is 576, which works out to be less than 0.5° between any two points. The fixture 20 starts out rotating the femoral component 21 or 22 in a counterclockwise direction. After one complete turn, the grinding wheel 12 retracts in the Z direction to allow it to step over to the next path for grinding. As explained above, each step-over path is defined by the planes. Thus, the number of step-over points is defined by the width of the section less the initial path already taken divided by the step-over size, which is 0.020 inches for the outer sections 108A and 108F and 0.015 inches for the inner sections 108B–E.

Proceeding next to step 334, data points are created defining grinding paths for a ball-endmill tool having the grinder nose radius $R_F$. The data points define the paths that a ball-endmill tool having a radius $R_F$ will have to travel to create the contour of the prosthesis model. Additionally, in the preferred embodiment, the order of data paths travelled by the tool is as follows: first, the data points are created from the outside to the inside for sections 108A, 108B and 108C. Then, data points are created, again from the outside to the inside, for sections 108F, 10BE and 108C. This has been found to produce more accurate results.

Figure 15B:
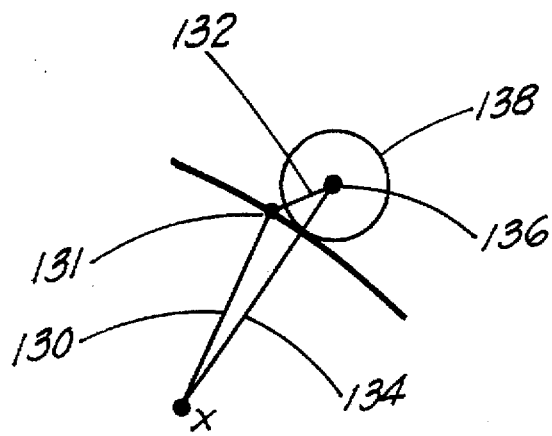
FIGS. 15B–C show a geometric diagram of various points to illustrate how data points for the CNC grinder are calculated.

The values of the data points for the grinding paths of the ball-endmill tool having radius $R_F$ represent the distance between center X axis and the center of the ball-endmill tool. Referring to FIG. 15B, the center axis of a ball-endmill tool 138 having radius $R_F$ is shown as point 136. Point 131 illustrates a point on the surface of the prosthesis model. The distance between the X axis and the point 131 is represented by vector 130. The distance between the surface point 131 and the center point 136 of the ball-endmill tool 138 is represented by a vector 132. A vector 134 pointing perpendicularly from the X axis is connected also to the center point 136. Vectors 130, 132 and 134 form approximately a right triangle, with the right angle located adjacent the point 131. The distances represented by both vectors 130 and 132 are known. From the known distances, the value of the vector 134 is calculated. The value of the vector 134 is the value of the data point representing the grind path for surface point 131. The above calculation is performed for each point on the surface of the prosthesis model to obtain the grinding path data points for the ball-endmill tool having a radius $R_F$.

Proceeding next to step 336, the data points created for the section are stored in a separate CLS program or file. Before proceeding to the next section, the data created for the previous section are stored in a CLS file to avoid tying up the memory resources of the workstation. The typical amount of time it takes to complete steps 326–334 for each section is 18 to 27 hours. Next, in step 337, it is determined if all the sections have been processed. If not, control returns to step 326. Otherwise, control proceeds to step 206.

In step 206, as explained above, the data points in each of the CLS files are converted into actual part geometry dimensions. The CLS files store the data points for the grinding paths as spatial points. Step 206 converts these spatial points into actual X-Y-Z coordinates. Proceeding next to step 338, the planes defined in step 318 above in each section are used to cross-section the cylinder enclosing that section. Such cross-sectioning of the cylinder creates a plurality of surface arcs or spline rows on the surface of the cylinder. These spline rows or surface arcs define the rotational path of the grinding wheel 12 on the surface of the femoral component 21 or 22. Next, in step 340, the group of arcs is assigned a name for later identification. Proceeding next to step 341, it is determined if each section has been processed. If not, control returns to step 338. Otherwise, control proceeds to step 342.

In step 342, a clearance plane is defined. The clearance plane is actually a cylinder around the fixture axis 102, with the surface being set two inches from the axis 102. The clearance plane defines the active area into which the grinding wheel can cut and prevents the grinding wheel 12 from damaging the fixture 20. Next, in step 344, the feed rates of the various moving parts of the CNC grinder 11 are defined. The rotational speed of the fixture 20 along its axis 102 is preferably set either at 9,600° or 12,000° per minute along the C axis. The rate at which the grinding fixture 20 steps from one path to the next path along the X axis is set at 50 inches per minute (ipm). The rate at which the grinding wheel 12 can move in the Z direction towards the femoral component 21 or 22 is set at 25 ipm. Finally, the rate at which the grinding wheel 12 retracts from the femoral component 21 or 22 is 50 ipm. For purposes of the CAD/CAM program, the retraction position of the tool is set at 0.1 inches from the part. However, as will be explained below, these retractions are removed from the data actually sent to the CNC grinder 11.

Next in step 346, the axis 102 of the fixture 20 (which corresponds exactly to the X axis) is set perpendicular to the center of the arc for each tool path. This effectively defines the X axis as being perpendicular to the top and bottom faces of the cylinder enclosing each section. Proceeding next to step 348, the projection vector is defined as being perpendicular to the center of the arc for each tool path. This effectively defines the projection vector as pointing perpendicularly away from the X axis or the axis 102 of the fixture 20. Next, in step 350, the direction along the surface arc paths of the grinding wheel 12 is defined. The rotational direction in which the grinding wheel 12 moves over the surface of the femoral component 21 or 22 alternates for each subsequent path. The fixture 20 begins by rotating in a counter-clockwise direction along the C axis. Once the grinding wheel 12 has completed the first rotational path, the grinding fixture 20 steps over to the next path. The fixture 20 then rotates in the opposite direction, that is, in the clockwise direction. When this path is completed, the grinding wheel 12 steps to the next path in the fixture 20 and again rotates in the counter-clockwise direction. This alternating scheme continues until the grinding wheel 12 reaches the end of the section, at which time the process begins again for the next section.

Next, in step 352, the data points created in the first CLS files for the ball-endmill tool having a $R_F$ are modified to compensate for the radius $R_W$ of the grinding wheel 12. The modification is performed by projecting the data points on each surface arc path for a ball-endmill tool having a radius $R_W$. This effectively projects the data points to the center axis 18 of the grinding wheel 12. By projecting data for each arc individually, the compensation for the wheel radius $R_W$ occurs only radially along the C axis, but no compensation occurs in the axial direction along the X axis. This is critical as compensation in the axial direction for the wheel radius $R_W$ would result in the fixture 20 being positioned incorrectly relative to the wheel 12. In other words, if compensation was provided both axially and radially, the lateral/medial movement along the X axis of the fixture 20 would assume a cutting surface having radius $R_W$ rather than $R_F$.

Figure 15C:
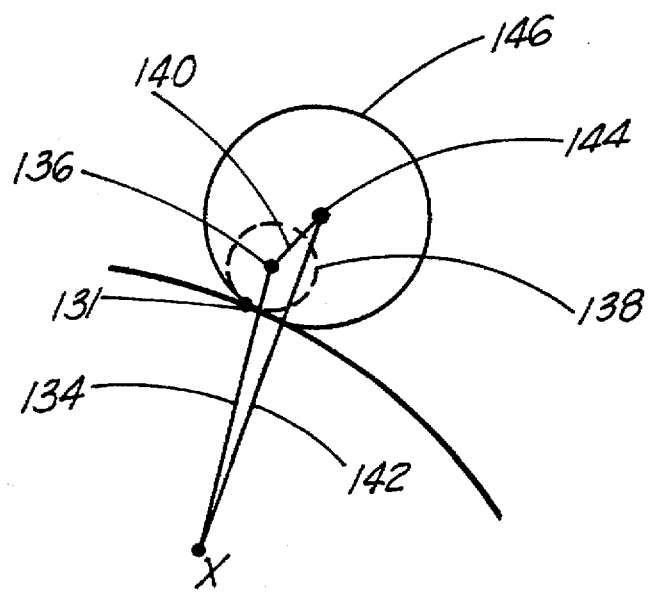

Referring to FIG. 15C, the method of projecting the data point is illustrated. It is noted that the vector 134 extending perpendicularly from the X axis to the center 136 of the ball-endmill tool 138 was calculated in step 326. In FIG. 15C, vectors 134, 140 and 142 also form generally a right triangle. The vector 140 extends from the center point 136 of the ball-endmill tool 138 to the center point 144 of a ball-endmill tool 146 having a radius $R_W$. The values of vectors 134 and 140 are known, from which the value of the vector 142 is calculated. The value of the vector 142 forms the value of the data point representing the grinding path for surface point 131 for a ball-endmill tool of radius $R_W$. The above calculation is repeated for each point on the surface of the prosthesis model.

In the preferred embodiment, the fixed axis version of the CAD/CAM surface milling program is used. In the fixed version, four axes can be defined. In this case, the four axes are the X, Y, Z and C axes. If it is desired that more axes be defined for better accuracy, the variable axis version of the CAD/CAM software can be utilized, in which 5 or more axes can be defined.

Having modified the data points radially for a ball-endmill tool having a radius $R_W$, and setting and defining various parameters, the data points for the section are saved as the second version of the CLS files in step 354. Next, in step 355, it is determined if all the sections have been processed. If not, control returns to step 342. otherwise, control proceeds to step 356.

In step 356, the program for each section is edited by stripping out the retracts from each tool path, except for the very last tool path, for which the grinding wheel 12 should retract 4 inches away from the center axis 102 of the fixture 20. The intermediate retracts are not necessary as the step-over of the grinding wheel 12 between consecutive paths occur in the region where the extension surfaces are located in the computer model. In the actual femoral component 21 or 22, the extension surfaces do not exist, thereby allowing the grinding fixture 20 to step over without first having to retract.

Next, in step 358, the 4 or 6 CLS programs are combined to form a single main grind program. The four or six CLS programs are arranged in order so that the grinding wheel 12 starts on one side of the femoral component and ends up on the other side. Next, in step 360, the data stored in the main grind program are displayed to insure that there are no obvious mistakes. Next, in step 362, the data in the main grind program are post processed. Post processing entails changing the names of the X, Y, Z and C axes so that the CNC grinder 11 can understand the data points in the main grind program. Next, the post processed data are mirrored through the Y-Z plane to create the right knee version of the data, with the mirrored data stored in another grind program. Finally, proceeding to step 214, the main grind program is downloaded to a tape. The tape is then mounted onto the CNC grinder 11 for loading into the grinder controller. The data in the main grind program controls the CNC grinder 11 in shaping the desired femoral prosthesis.

Thus, a process has been described that generates grinding paths for a CNC grinder from data points representing a CAD/CAM model of a prothesis joint device. The grinding paths are uploaded into a CNC grinder to shape the desired joint prothesis. Due to the relatively complex geometries to be shaped on the prosthesis, the nose or surface radius of the grinding wheel on a CNC grinder becomes a significant factor in the generation of data for control of the CNC grinder. As a result, in generating the CNC data, both the radius of the grinding wheel and its nose radius must be taken into account. The process involves first creating data points along the grinding paths to compensate for a ball-endmill tool having a radius equal to the nose radius of the grinding wheel. Next, that data is modified into data points along the path to radially compensate for a ball-endmill tool having a radius of the grinding wheel. In this manner, grinding paths over the surface of a CAD/CAM joint prosthesis model are defined, with the first calculations using the nose radius defining the cutting limitations for lateral movement and the second calculations using the wheel radius defining the cutting limitations for circumferential movement. These data points are post-processed into a format that can be understood by the CNC grinder. The data is then uploaded to the CNC grinder for shaping the desired joint prothesis.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense. Further, the above has described the method and apparatus according to the present invention for a femoral knee prosthesis. It is to be understood that the method and apparatus can be modified for other types of joint prostheses.

We claim:

1. A method of generating a grind program for controlling a numerically controlled grinder for shaping a joint prosthesis workpiece, the grind program containing a plurality of grinding paths represented by data points generated from a computer model of a joint prosthesis, the computer model having an articulating surface, a first side, and a second side, the grinder including a grinding wheel having a wheel radius and which has a grinding surface having a nose radius, the grinder further including a fixture having a center axis for attaching the joint prosthesis workpiece, the fixture being rotatable in a radial direction about the center axis and being movable in an axial direction along the center axis, the grinding wheel being movable along a second axis that is perpendicular to the fixture center axis, the method comprising the steps of:

(a) defining a center axis for the computer model extending from the first side to the second side of the computer model, wherein said model center axis is defined to correspond exactly with the fixture center axis;

(b) generating a first set of data points representing grinding paths for a first ball-endmill tool having a radius equal to the nose radius, each of said data points in said first set defining the relative position of the fixture relative to said first ball-endmill tool;

(c) determining a second set of data points from said first set of data points, said second set of data points representing grinding paths compensated radially for a second ball-endmill tool having a radius equal to the wheel radius;

(d) storing said second set of data points in the grind program;

(e) post-processing the grind program into a format compatible with the numerically controlled grinder; and (f) transferring the post-processed grind program to the numerically controlled grinder.

2. The method of claim 1, further comprising the steps of:

(g) defining a cylinder having a center axis and a surface parallel to said cylinder center axis, wherein said cylinder encloses the computer model, and wherein said cylinder center axis corresponds approximately with said model center axis; and (h) creating a plurality of rings on said cylinder surface, wherein said plurality of rings specify the plurality of radial paths of the grinding wheel with respect to the fixture, wherein a first predetermined distance is specified between two consecutive rings, and wherein said first and second set of data points are defined along said plurality of rings.

3. The method of claim 2, wherein said first and second set of data points are defined over approximately a 270° portion of each ring.

4. The method of claim 3, wherein 576 data points are specified along each ring.

5. The method of claim 1, wherein said prosthesis model is represented by a plurality of surface data points, wherein said first ball-endmill tool has a center point, and wherein each of said data points in said first set contains a value equal to the distance represented by a first vector extending perpendicularly from the model center axis to said center point of said first ball-endmill tool, said first vector forming one side of a first triangle, one other side of said first triangle representing the distance from the model center axis to a data point on the surface of the prosthesis model, and the final side of said first triangle representing the distance from said surface data point to said center point of said first ball-endmill tool.

6. The method of claim 5, wherein said second ball-endmill tool has a center point, and wherein each of said data points in said second set contains a value equal to the distance represented by a second vector extending perpendicularly from the model center axis to the center point of said second ball-endmill tool, said second vector forming one side of a second triangle, one other side of said second triangle represented by said first vector, and the final side of said second right triangle representing the distance from said center point of said first ball-endmill tool to said center point of said second ball-endmill tool.

7. The method of claim 6, wherein corresponding first and second set data points are calculated from each of said plurality of surface data points.

8. The method of claim 1, wherein steps (a)–(c) are performed in a computer system having a certain amount of memory resources, wherein the computer prosthesis model is divided into a plurality of sections, and wherein steps (a)–(c) are performed separately for each of said plurality of sections to ensure that said computer system memory resources are not exceeded.

9. The method of claim 1, further comprising the step of:
defining a cylindrical plane about the model center axis which prevents penetration of the grinding wheel past said cylindrical plane to prevent damage to the fixture.

10. The method of claim 9, wherein said cylindrical plane is set approximately two inches from said model center axis.

11. The method of claim 2, wherein said first predetermined distance is 0.015 inches.

12. The method of claim 2, wherein said first set and second set of data points specify that the fixture rotates in alternating radial directions as the fixture is stepped along the axial direction.

13. The method of claim 12, wherein the grinding wheel traverses an entire radial path before stepping to the next radial path.

* * * * *